United States Patent
Bahrami et al.

(10) Patent No.: US 11,651,014 B2
(45) Date of Patent: May 16, 2023

(54) SOURCE CODE RETRIEVAL

(71) Applicant: FUJITSU LIMITED, Kawasaki (JP)

(72) Inventors: Mehdi Bahrami, San Jose, CA (US); Manisha Mukherjee, San Jose, CA (US); Wei-Peng Chen, Fremont, CA (US)

(73) Assignee: FUJITSU LIMITED, Kawasaki (JP)

( * ) Notice: Subject to any disclaimer, the term of this patent is extended or adjusted under 35 U.S.C. 154(b) by 49 days.

(21) Appl. No.: 17/085,894

(22) Filed: Oct. 30, 2020

(65) Prior Publication Data
US 2022/0138240 A1     May 5, 2022

(51) Int. Cl.
| | | |
|---|---|---|
| G06F 16/33 | (2019.01) | |
| G06F 40/226 | (2020.01) | |
| G06N 3/08 | (2023.01) | |
| G06N 3/04 | (2023.01) | |
| G06F 8/70 | (2018.01) | |
| G06F 8/30 | (2018.01) | |
| G06F 16/332 | (2019.01) | |
| G06F 11/36 | (2006.01) | |

(52) U.S. Cl.
CPC .......... *G06F 16/3347* (2019.01); *G06F 8/30* (2013.01); *G06F 8/70* (2013.01); *G06F 11/3664* (2013.01); *G06F 11/3684* (2013.01); *G06F 16/3329* (2019.01); *G06F 16/3332* (2019.01); *G06F 16/3344* (2019.01); *G06F 40/226* (2020.01); *G06N 3/04* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 9,766,868 B2 * | 9/2017 | Allen | ............... G06F 8/427 |
| 9,898,393 B2 * | 2/2018 | Moorthi | ............. G06F 11/368 |
| 10,115,055 B2 | 10/2018 | Weiss | |
| 10,545,733 B2 | 1/2020 | Sabharwal | |

(Continued)

OTHER PUBLICATIONS

Listead, Erik et al. "Sourcer mining and searching internet-scale software repositories" Oct. 15, 2008.

(Continued)

*Primary Examiner* — Lewis A Bullock, Jr.
*Assistant Examiner* — Mark A Gooray
(74) *Attorney, Agent, or Firm* — Maschoff Brennan

(57) ABSTRACT

A method may include obtaining training code and extracting features from the training code. The extracted features of the training code may be mapped to natural language code vectors by a deep neural network. A natural language search query requesting source-code suggestions may be received, and the natural language search query may be mapped to a natural language search vector by the deep neural network. The method may include mapping the natural language search query to the natural language search vector in the same or a similar method as mapping the extracted features of the training code to natural language code vectors, and the natural language search vector may be compared to the natural language code vectors. Source code responsive to the natural language search query may be suggested based on the comparison between the natural language search vector and the natural language code vectors.

20 Claims, 6 Drawing Sheets

(56) References Cited

U.S. PATENT DOCUMENTS

| | | | | |
|---|---|---|---|---|
| 11,176,329 | B2* | 11/2021 | Vaithiyanathan | G06F 40/30 |
| 2021/0089331 | A1* | 3/2021 | Sheoran | G06F 3/048 |
| 2021/0303989 | A1* | 9/2021 | Bird | G06N 3/08 |
| 2022/0004365 | A1* | 1/2022 | Pujar | G06F 40/40 |
| 2022/0012018 | A1* | 1/2022 | Trim | G06F 8/73 |
| 2022/0077878 | A1* | 3/2022 | Husain | H04K 3/25 |

OTHER PUBLICATIONS

Study by Yang et al. "From Query to Usable Code: An Analysis of Stack Overflow Code Snippets" May 14, 2016.
Kang, Hong Jin et al. "Assessing the Generalizability ofcode2vec Token Embeddings" Nov. 2019.
Karampatsis, Rafael-Michael et al. "Big Code != Big Vocabulary: Open-Vocabulary Models for Source Code" Jun. 11, 2020.
Gu, Xiaodong et al. "Deep Code Search" May 2018.
Nam, Daye et al. "MARBLE: Mining for Boilerplate Code to Identify API Usability Problems" Nov. 2019.

* cited by examiner

SOURCE CODE RETRIEVAL

The present disclosure generally relates to retrieving source code.

BACKGROUND

A user interested in achieving a task utilizing implementation of source code may not understand how to write software programs effectively to achieve a task and may want to search for source code that could be used to complete the task. However, searching for such source code may not be effective using current approaches.

Deep learning is a subset of machine learning in which a deep neural network may use multiple layers of processing to extract information from an input dataset that may result in output more complex than the outputs of a traditional machine learning model. The multi-layer aspect of deep learning may allow the deep learning model to progressively analyze different characteristics of an input dataset resulting in high-level, abstract outputs more similar to human decision making.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a method may include obtaining training code from one or more training code servers. Features of the training code, such as code snippets, software documentation, and code comments, may be extracted from the training code and stored in a code dataset. The extracted features of the training code may be mapped to natural language code vectors by a deep neural network. A natural language search query may be received, wherein the natural language search query is requesting source-code suggestions. The method may include organizing the natural language search query into a first natural language search section and a second natural language search section. The natural language search query may be mapped to a natural language search vector by the deep neural network. The method may include mapping the natural language search query to the natural language search vector in the same or a similar method as mapping the extracted features of the training code to natural language code vectors, and the natural language search vector may be compared to the natural language code vectors. The method may include using a cosine similarity between the natural language search vector and the natural language code vectors to determine the relatedness between the natural language search vector and the natural language code vectors. Source code responsive to the natural language search query may be suggested based on the comparison between the natural language search vector and the natural language code vectors.

The object and advantages of the embodiments will be realized and achieved at least by the elements, features, and combinations particularly pointed out in the claims. It is to be understood that both the foregoing general description and the following detailed description are explanatory and are not restrictive of the invention, as claimed.

BRIEF DESCRIPTION OF THE DRAWINGS

Example embodiments will be described and explained with additional specificity and detail through the accompanying drawings in which.

DETAILED DESCRIPTION

Figure 1:
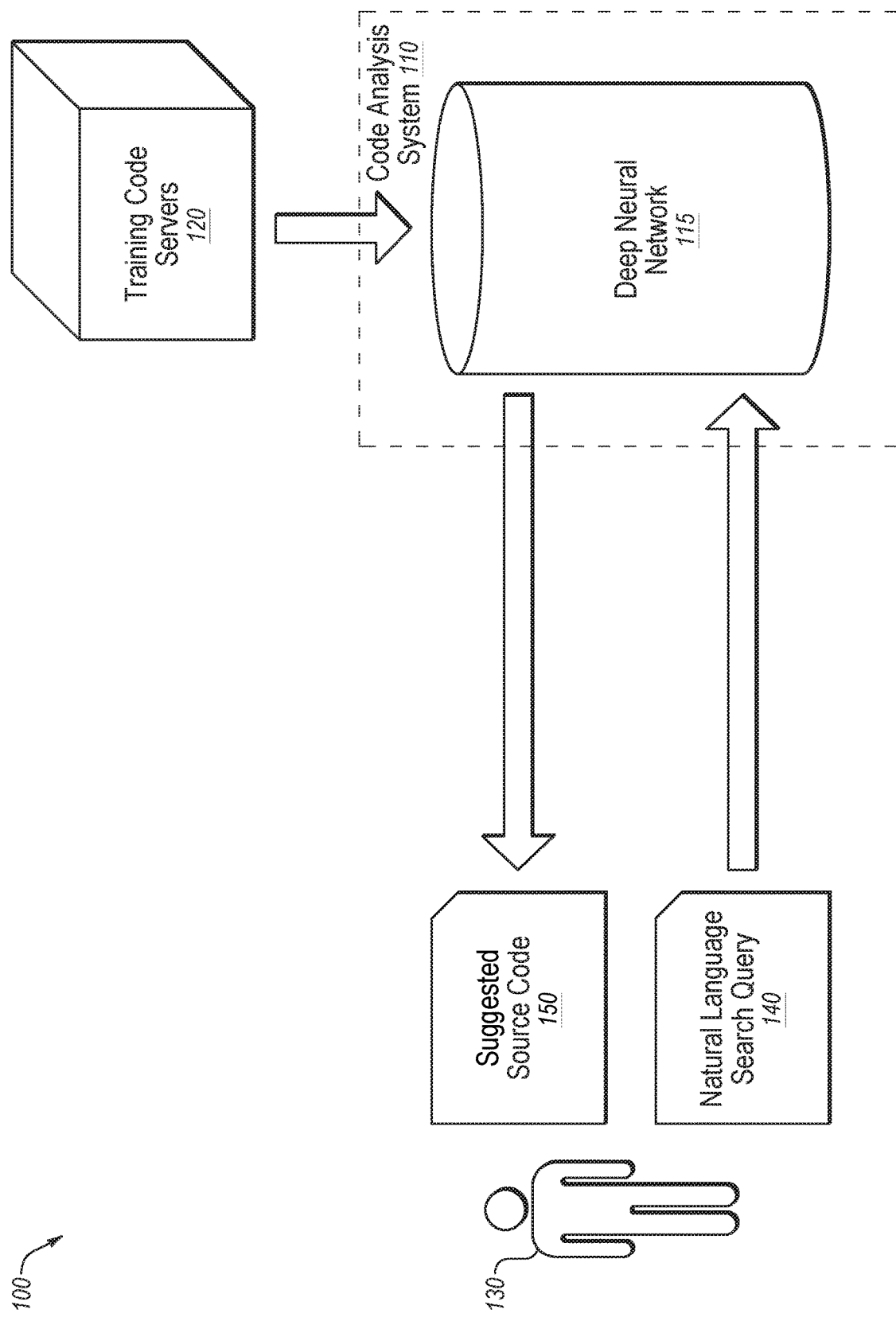
FIG. 1 is a diagram representing an example system related to responding to a natural language search query with suggested source code.

The embodiments described in the present disclosure may relate to effectively providing source code to a user in response to a search query. In some circumstances, users may not be familiar with or skilled at writing or finding source code. Additionally or alternatively, a user may have trouble implementing a proposed solution or writing code and may want to search for source code known to run without error. Additionally or alternatively, a user may want to search for source code to get ideas on how to improve source code written by the user. Code searching may allow a user to find source code responsive to the user's problem. In some code searching systems, the user may enter a natural language search phrase, and the code searching system may find and retrieve source code based on well-known information retrieval methods and systems.

Information retrieval methods of code searching may not find and retrieve source code most responsive and helpful to the user performing the code search. There may be a mismatch between the high-level intent of a user-generated natural language search phrase and the low-level implementation and context in which natural language words and phrases are used in source code. Programming languages and natural languages may not share syntactical structures, synonyms, or even word definitions and may only be semantically related at a high level of abstraction. Consequently, the results of a code search relying on well-known information retrieval methods may not present source code most relevant to a user-generated search query.

The present disclosure may be directed to, among other things, improving the accuracy and relevance of code search results responsive to a natural language search query. For example, a deep neural network may facilitate vector comparisons between potential source-code results and the natural language search query. In particular, as described in further detail below, a code analysis system, including a deep neural network, may be configured to obtain training code from which the code analysis system may extract various features of the training code and store the extracted features and training code in one or more code datasets. The code analysis system may map the extracted features of the training code to natural language code vectors. The natural language search query may also be mapped to a natural language search vector and may be compared to the natural language code vectors. The code analysis system may then return suggested source code relevant to the natural language search query based on the comparisons between the natural language search vector and the natural language code vectors.

Certain embodiments of the present disclosure may provide improvements over previous iterations of software code generation and/or searching systems. For example, software development may be improved by configuring a computer system in a manner in which the computing system is able to provide code searching results more responsive and relevant to a code search query. As another example, software development may be improved by configuring a computer system in a manner in which the computer system is able to combine two or more code searching results responsive to the same search query resulting in more effective software integration. For example, the comparison of natural language search and code vectors may facilitate a more focused comparison to yield more helpful results. As another example, computing and network resources may be preserved as repeated and iterative searching to try and find helpful results may be avoided or reduced as more helpful results are provided in the first instance.

Embodiments of the present disclosure are explained with reference to the accompanying figures.

FIG. 1 is a diagram representing an example system 100 related to responding to a natural language search query with suggested source code, in accordance with one or more embodiments of the present disclosure. The system 100 may include a code analysis system 110, which further includes a deep neural network 115. The code analysis system 110 may obtain training code from training code servers 120, and the code analysis system 110 may receive a natural language search query 140. The code analysis system 110 may receive multiple natural language search queries 140, and the natural language search queries 140 may be sent by one or more users 130. The code analysis system 110 may respond to the natural language search queries 140 with suggested source code 150. For example, the code analysis system 110 may respond to the natural language search queries 140 by returning the suggested source code 150 to the user 130. The suggested source code 150 may be identified using the training code obtained from training code servers 120. While reference is made to "the user 130," it will be appreciated that the user 130 is using an electronic device to communicate and interact with the code analysis system 110.

The code analysis system 110 may include a deep neural network 115, which may receive the training code obtained from training code servers 120. In some embodiments, the deep neural network 115 may analyze the training code obtained from training code servers 120 and extract features of the training code. Additionally or alternatively, the deep neural network 115 may map features extracted from the training code to natural language code vectors. Additionally or alternatively, deep neural network 115 may map natural language search queries to natural language search vectors. Additionally or alternatively, the deep neural network 115 may compare the natural language search vectors to the natural language code vectors and suggest source code responsive to the natural language search query based on the comparison between the natural language search vectors and the natural language code vectors. In some embodiments, the deep neural network 115 may include at least one of a multi-layer perceptron (MLP) network, a long short-term memory (LSTM) network, or an average-stochastic gradient descent weight-dropped long short-term memory (AWD-LSTM) network. Examples of the various operations performed by the deep neural network 115 may be described with greater detail in FIGS. 2-6.

The natural language search query 140 may be any suitable search query related to performing tasks that utilize source code to implement. For example, the natural language search query 140 may include the phrase "plot a line." In this example embodiment, the natural language search query 140 may represent the user 130 searching for source code that allows the user to plot a line. In some embodiments, the natural language search query 140 may include two or more natural language search sections. For example, the natural language search query 140 may include the phrase "send SMS to my phone when I receive an email with the title of X." In this example embodiment, the natural language search query 140 may include a first natural language search section relating to "send SMS" and a second natural language search section relating to "when I receive an email with the title of X."

The suggested source code 150 may be any suitable source code responsive to the natural language search query 140. The code analysis system 110 may output the suggested source code 150 from the obtained training code based on similarities between the natural language search query 140 and the training code obtained from training code servers 120. In some embodiments, where the natural language search query 140 includes multiple natural language search sections, the suggested source code 150 may include multiple pieces of source code that are responsive to the multiple natural language search sections, respectively (e.g., first and second pieces of source code may correspond to respective first and second natural language queries). Additionally or alternatively, the suggested source code 150 may include a single piece of source code corresponding to the multiple sections.

Modifications, additions, or omissions may be made to the system 100 without departing from the scope of the disclosure. For example, the designations of different elements in the manner described is meant to help explain concepts described herein and is not limiting. Further, the system 100 may include any number of other elements or may be implemented within other systems or contexts than those described.

Figure 2:
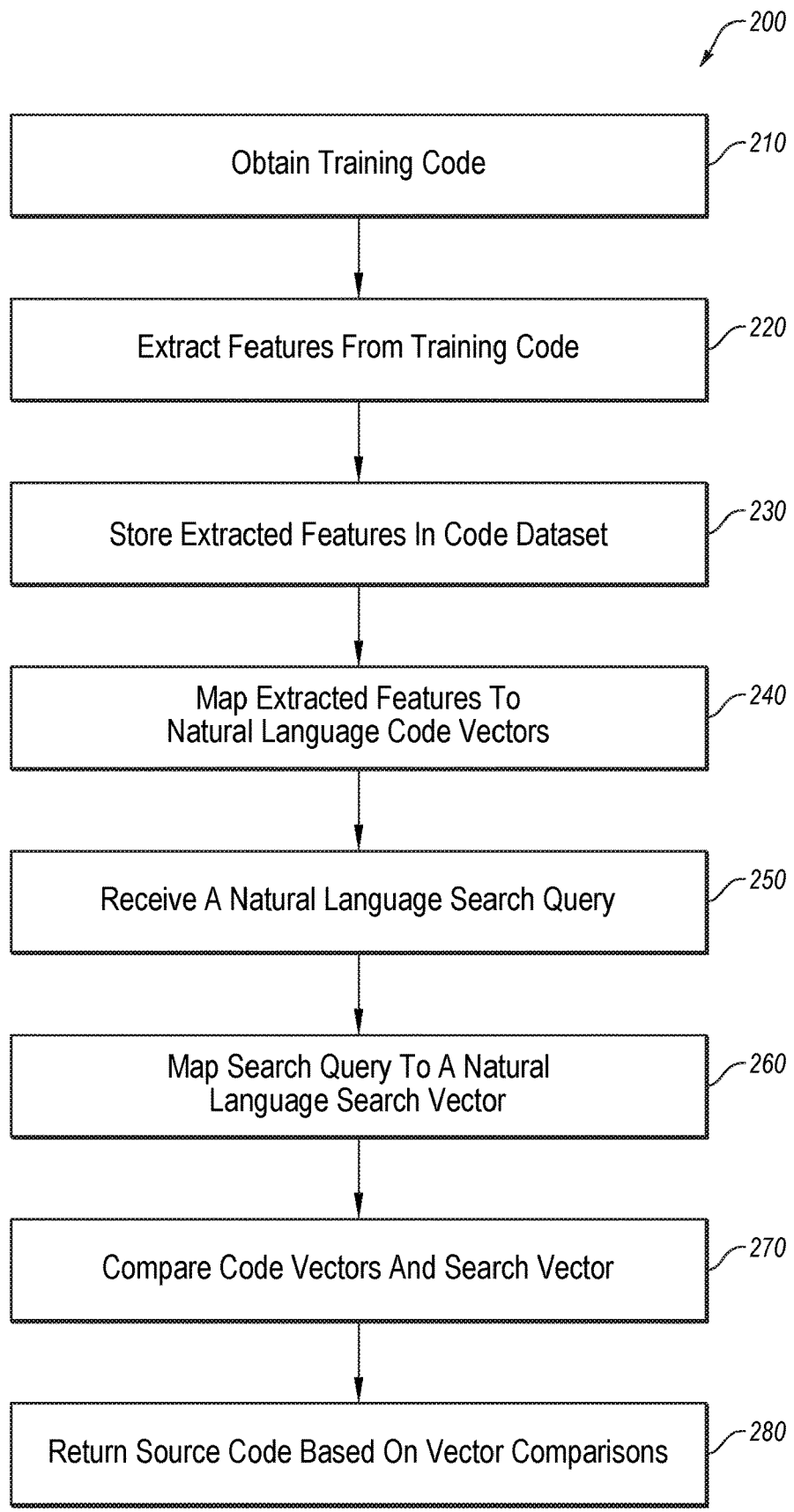
FIG. 2 is a flowchart of an example method of responding to a natural language search query with suggested source code.

FIG. 2 is a flowchart of an example method 200 of responding to a natural language search query with suggested source code according to at least one embodiment described in the present disclosure. The method 200 may be performed by any suitable system, apparatus, or device. For example, the code analysis system 110, the training code servers 120, and/or the user 130 may perform one or more of the operations associated with the method 200. Although illustrated with discrete blocks, the steps and operations associated with one or more of the blocks of the method 200 may be divided into additional blocks, combined into fewer blocks, or eliminated, depending on the particular implementation.

The method 200 may begin at block 210, where training code may be obtained. For example, the training code may be obtained by a code analysis system (such as the code analysis system 110) from one or more training code servers (such as the training code server 120). The training code may include code from any number of sources including open-source projects (e.g., GITHUB projects, SOURCEFORGE projects, GITLAB projects, etc.), if-this-then-that (IFTTT) recipes, proprietary software, etc. Unnecessary information in the training code may be removed to provide more parseable and searchable training code. Unnecessary information in the training code may include extraneous line breaks, white space, "I" symbols, ">" symbols, etc. Removing unnecessary information from the obtained training code may facilitate parsing and/or searching within the training code, which may allow for extraction of previously uncaptured features. Previously uncaptured features may include test-case validation information or the parsed source code itself as described in greater detail with reference to FIG. 4. In some embodiments, the training code may be filtered such that the training code that is obtained is that which is considered popular. An example of determining whether or not code is popular may be described in greater detail with reference to FIG. 3.

At block 220, features of the training code may be extracted. The extracted features of the training code may include code snippets that perform distinct functions. For example, training code that performs the task of "sending an SMS when a user receives an email with the title of X" may include a snippet of code that perform the distinct function of sending an SMS, a code snippet that performs the distinct function of verifying a user has received an email, and a code snippet that performs the distinct function of verifying the email has a title of X. In these and other embodiments, the extracted features of the training code may further include documentation associated with the training code, comments in the source code, or test-case logs when the training code is run in an execution environment. For example, comments within a piece of source code may be extracted and stored as features relating to the piece of source code. As another example, whether a piece of source code can be executed successfully on a cloud-based platform (e.g., AMAZON WEB SERVICES (AWS), MICROSOFT AZURE, etc.) may be stored as a feature relating to the piece of source code (e.g., store "not executable on AWS" as a feature if execution of the piece of source code fails on AWS). The extracted features of the training code may be stored in one or more code datasets at block 230.

At block 240, each of the extracted features may be mapped to natural language code vectors. In some embodiments, a deep neural network, such as the deep neural network 115, may map each of the extracted features to natural language code vectors. Mapping each of the extracted features to natural language code vectors may include using joint embedding or multi-modal embedding to embed the extracted features of the training code and the natural language search queries into a unified vector space. For example, the joint embedding of the extracted features of the training code, X, into a unified vector space, V, may be represented by the following formula:

$$X \xrightarrow{\phi} V_X$$

where $\phi: X \rightarrow \mathbb{R}^d$ is an embedding function to map the extracted features of the training code, X, into a d-dimensional vector space, V. The natural language code vectors mapped at block 240 may be stored in a search index. Storing the natural language code vectors in the search index may facilitate more efficient recall of natural language code vectors for faster vector comparisons. In some embodiments, upon the completion of the block 240, the code analysis system may be configured, trained, and prepared to receive and process a query to the code analysis system.

At block 250, a natural language search query may be received. In some embodiments, the natural language search query may be received from a user, such as the user 130 in example system 100. In these and other embodiments, the natural language search query may be received from a computing system. In some embodiments, the natural language search query may two or more natural language search sections that make up the natural language search query.

At block 260, the natural language search query may be mapped to a natural language search vector. In some embodiments, a deep neural network, such as the deep neural network 115, may map the natural language search query to a natural language search vector. In these and other embodiments, the natural language search query may include more than one request for suggested source code. Mapping the natural language search query to the natural language search vector may include preparing the natural language search query for vectorization, for example, by removing unnecessary text from the query and tokenizing the query. Tokenizing the natural language search query may include dividing the natural language search query into individual words. For example, a natural language search query of "plot a line" may be tokenized into the three individual words "plot," "a," and "line." Mapping the natural language search query to the natural language search vector may include using joint embedding or multi-modal embedding to embed the natural language search query to the same vector space as the natural language code vectors. For example, the joint embedding of the natural language search query, Y, into the same unified vector space containing the natural language code vectors, X, may be represented by the following formula:

$$Y \xrightarrow{\psi} V_Y \xrightarrow{\psi} (V_X, V_Y)$$

where $\psi: Y \rightarrow \mathbb{R}^d$ is an embedding function to map the natural language search query, Y, into the same vector space containing the natural language code vectors, V, such that the natural language search vector and the natural language code vectors occupy nearby regions of the vector space, ($V_X$, $V_Y$).

At block 270, the natural language search vector may be compared to the natural language code vectors. The comparison between the natural language search vector and the natural language code vectors may determine a degree of similarity between the natural language search vector and the natural language code vectors. For example, such a comparison may be performed according to the following relation:

$$X \xrightarrow{\phi} V_X \xrightarrow{\phi} J(V_X, V_Y) \xleftarrow{\psi} V_Y \xleftarrow{\psi} Y$$

where $J(V_X, V_Y)$ may be a similarity measure to provide a score of the similarity between $V_X$ and $V_Y$. The natural language search vector may be compared (e.g., iteratively compared) to the natural language code vectors stored in the search index at block 240. In some embodiments, the comparison between the natural language search vector and the natural language code vectors may be based on a cosine similarity between the natural language search vector and each of the natural language code vectors such that $J(V_X, V_Y)$ represents an embedding function that determines the cosine similarity between the natural language search vector and the natural language code vectors.

At block 280, suggested source code responsive to the natural language search query may be returned based on the comparison between the natural language search vector and the natural language code vectors as performed at block 270. The suggested source code may be source code associated with the extracted features of the training code that were stored in the one or more code datasets at block 230. In these and other embodiments, the suggested source code may be source code associated with the natural language code vectors found to be most similar to the natural language search vector at block 270 or have a similarity score above a threshold score. In some embodiments, multiple suggestions of source code may be provided as code responsive to the query. In these and other embodiments, such a response may or may not include the relative scores of the suggestions of source code such that the user can select the highest scored source code, or may view the different responsive source codes and select the one that fits their project.

Modifications, additions, or omissions may be made to the method 200 without departing from the scope of the disclosure. For example, the designations of different elements in the manner described is meant to help explain concepts described herein and is not limiting. Further, the method 200 may include any number of other elements or may be implemented within other systems or contexts than those described.

Figure 3:
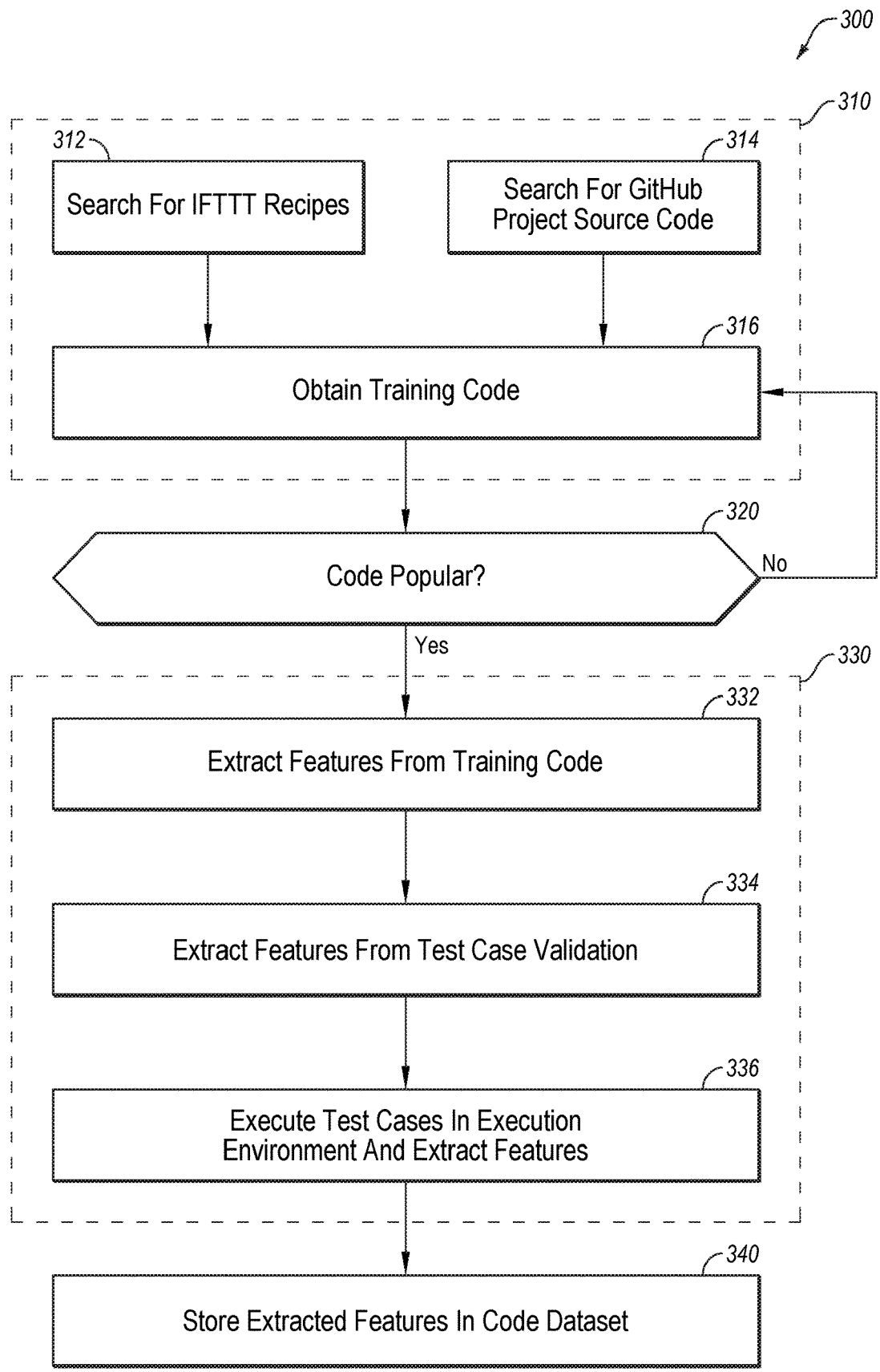
FIG. 3 is a flowchart of an example method of obtaining training code and extracting features from the training code.

FIG. 3 is a flowchart of an example method 300 of obtaining training code and extracting features from the training code. In some embodiments, the method 300 may provide a more detailed description of the steps described in method 200 at blocks 210, 220, and/or 230. In some embodiments, the method 300 may replace the steps described in method 200 at blocks 210, 220, and/or 230. The method 300 may be performed by any suitable system, apparatus, or device. For example, the code analysis system 110, the training code servers 120, and/or the user 130 may perform one or more of the operations associated with the method 300. Although illustrated with discrete blocks, the steps and operations associated with one or more of the blocks of the method 300 may be divided into additional blocks, combined into fewer blocks, or eliminated, depending on the particular implementation.

Method 300 may begin at block 310, where training data is found and obtained. Training code may be found from a variety of sources. For example, at block 312, IFTTT recipes may be found on one or more websites or repositories known to store IFTTT code. As another example, at block 314, open-source projects or repositories, such as GITHUB projects, SOURCEFORGE projects, etc., may be searched. In these and other embodiments, training code may be found from any other sources, such as from STACKOVERFLOW and other publicly available source-code repositories, from proprietary software that is not publicly available, or from any other sources. At block 316, the source code found at blocks 312 and 314 may be used as training code. The training code acquisition step performed at block 316 may be the same or a similar step to the training code acquisition method step performed at block 210 of the method 200.

At block 320, the popularity of the training code found and obtained at block 310 may be determined. For example, as an approach to filter the quantity of results, popularity may be used to reduce the number of source-code projects used as training code. For example, the quantity of training code obtained at block 310 may be too high and pose performance problems for training a code analysis system (such as the code analysis system 110) or a deep neural network (such as the deep neural network 115), and a procedure for filtering the obtained training code may be beneficial. As another example, the quality of training code obtained at block 310 may be inconsistent and pose accuracy problems for training the code analysis system or the deep neural network. In these and other embodiments, the popularity of the training code may function as a metric for filtering the obtained training code. The popularity of the training code may be a popularity rating determined based on various metrics associated with the training code. For example, publicly available GITHUB projects may have a number of stars, number of forks, number of watch lists, number of commits, number of pull requests, etc. Additionally or alternatively, a minimum number of reviews with key words (e.g., "works," "great," "happy," etc.) or any other metric may be used to determine popular sources of source code.

After determining the popularity rating of the training code, the training code may be sorted based on popularity ratings. A portion of the training code sorted by popularity ratings may be selected as the filtered training code. In some embodiments, a threshold percentage of the sorted training code may be selected as the filtered training code (e.g., the top 20% of the sorted training code in terms of their popularity ratings may be selected as the filtered training code). In some embodiments, a threshold absolute number of the sorted training code may be selected as the filtered training code (e.g., the top 100 pieces of the sorted training code in terms of their popularity ratings may be selected as the filtered training code). In some embodiments, a popularity rating may be selected as a popularity threshold to filter the training code (e.g., all sorted training code with a popularity rating above 10 may be selected as the filtered training code). In these and other embodiments, the threshold percentage, absolute number, or popularity value may be determined based on a statistical evaluation approach (e.g., an unknown threshold, X, may be determined such that the filtered training code includes at least 10 pieces of source code for each extracted feature). Additionally or alternatively, the various thresholds may operate on a per-feature basis (e.g., the 10 most popular pieces of source code associated with each extracted feature may be obtained).

At block 330, features of the filtered training code may be extracted. Feature extraction at block 330 may include extracting features of the training code at block 332 by the same process or a similar process as described in relation to feature extraction at block 220 of method 200. Feature extraction at block 330 may further include extracting features of the training code at block 334 based on testing and running the training code. Feature extraction at block 330 may further include extracting features of the training code at block 336 based on testing the training code in specific execution environments. In some embodiments, the feature extraction steps at blocks 334 and/or 336 may be omitted.

At block 334, features of the obtained training code may be extracted by testing the obtained training code. Testing the obtained training code may be based on sample test cases provided in the training code documentation or comments. Testing the obtained training code may further include parsing and validating the obtained training code. Parsing and validating the obtained training code may include analyzing the syntax of the obtained training code to ensure the obtained training code is grammatically proper (e.g., will not result in syntax errors when executed). Parsing and validating the obtained training code may provide previously uncaptured features for extraction, such as syntactical error messages. In these and other embodiments, the parsed training code itself may be extracted as one or more features of the obtained training code.

At block 336, features of the obtained training code may be extracted by testing the obtained training code in specific execution environments. Execution environments for the obtained training code may include specific operating systems, local internal environments, cloud-based platforms, etc. Execution environments in which the obtained training code may be tested may be determined from documentation of the obtained training code. For example, PYTHON source code obtained as training code may include documentation from TOX, a PYTHON-specific test command line tool, indicating the source code may be compliant with various versions of PYTHON (such as indicating that the code is compliant with Python3.5 and Python3.6). Testing obtained training code in specific execution environments may allow extraction of additional features not captured by static analysis of the training code, such as error messages, dependency issues, presence of exception events, etc.

At block 340, the features extracted at block 330 may be stored in one or more code datasets. Storage of the extracted features in the one or more code datasets may be accomplished in the same process or by a similar process as the storage of extracted features as described at the block 230 of method 200. The source code from which the features were extracted may be stored in the one or more code datasets along with the extracted features.

Modifications, additions, or omissions may be made to the method 300 without departing from the scope of the disclosure. For example, the designations of different elements in the manner described is meant to help explain concepts described herein and is not limiting. Further, the method 300 may include any number of other elements or may be implemented within other systems or contexts than those described.

Figure 4:
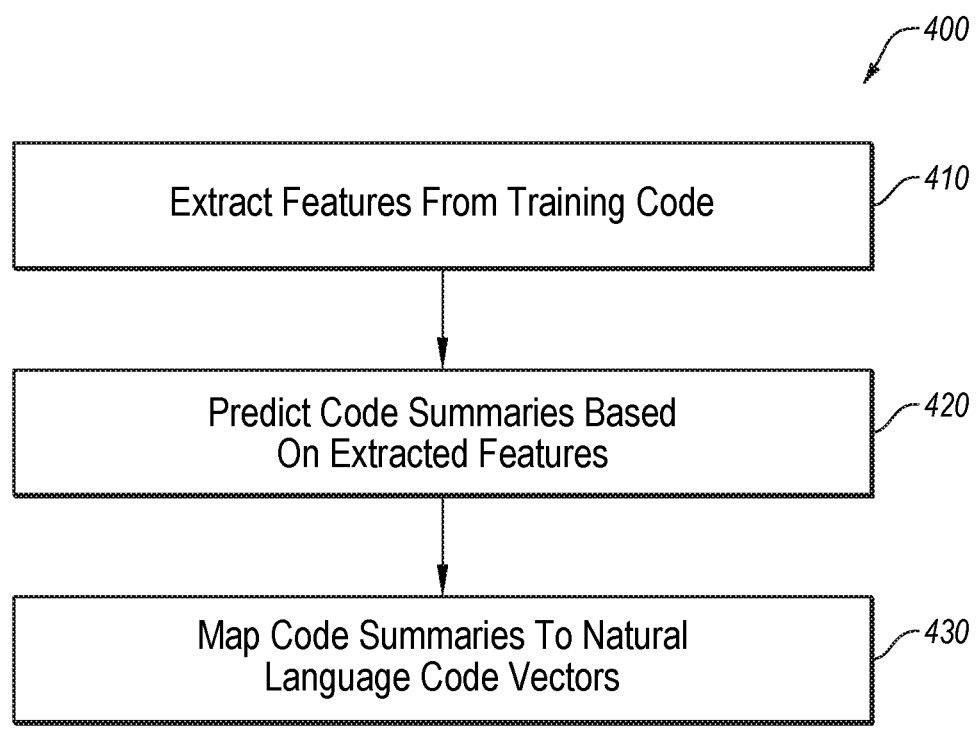
FIG. 4 is a flowchart of an example method of predicting code summaries based on the extracted features from the training code.

FIG. 4 is a flowchart of an example method 400 of predicting and generating code summaries based on the extracted features from the training code. In some embodiments, the method 400 may provide a more detailed description for the steps described in method 200 at blocks 220, 230, and/or 240 or method 300 at block 330. In these and other embodiments, extracting features from the training code at block 410 may be performed in the same process or a similar process to extracting features from the training code at block 220 of method 200 or at block 330 of method 300. In these and other embodiments, extracting features from the training code at block 410 may further include the same process or a similar process to extracting features from test-case validations at block 334 of method 300 or extracting features from test cases executed in execution environments at block 336 of method 300. The method 400 may be performed by any suitable system, apparatus, or device. For example, the code analysis system 110, the training code servers 120, and/or the user 130 may perform one or more of the operations associated with the example method 400. Although illustrated with discrete blocks, the steps and operations associated with one or more of the blocks of the method 400 may be divided into additional blocks, combined into fewer blocks, or eliminated, depending on the particular implementation.

The method 400 may begin at block 410, where features of the training code may be extracted. The extraction of the training code features at block 410 may be performed in the same process or a similar process to extracting features from the training code at block 220 of method 200. In these and other embodiments, extracting features from the training code at block 410 may further include extracting features of the obtained training code related to test-case validation and test-case validation in specific execution environments. In these and other embodiments, test-case validation and test-case validation in specific execution environments may include the same process or a similar process to extracting features from test-case validations at block 334 of method 300 or extracting features from test cases executed in execution environments at block 336 of method 300.

At block 420, code summaries may be predicted and generated based on the extracted features at block 410. Code summary prediction and generation may be facilitated by a code analysis system, such as the code analysis system 110 or the deep neural network 115. Code summaries may include natural language descriptions of the features extracted from the obtained training code, source code associated with the extracted features, or source code from which the features were extracted. Code summaries may be predicted and generated based on the features extracted from the training code, source code associated with the extracted features, or source code from which the features were extracted. In some embodiments, a code summary for a piece of source code may be predicted and generated based on one or more code snippets from the piece of source code in which the one or more code snippets reveal an order of execution for operations described in the piece of source code.

At block 430, natural language code vectors may be mapped based on the predicted and generated code summaries. The code summaries may be paired with the source code from which the summaries were predicted and generated to form code-summary pairs. The code-summary pairs may be mapped to a vector space as natural language code vectors such that two or more natural language code vectors that correspond to code-summary pairs describing the same or similar concepts may be close neighbors in the vector space. In these and other embodiments, two or more natural language code vectors that correspond to code-summary pairs describing different or dissimilar concepts may be further apart from each other in the vector space. A similarity score may be used to determine whether two or more natural language code vectors are close neighbors (and thus, the two or more code-summary pairs corresponding to the two or more natural language code vectors describe the same or similar concepts). For example, a cosine similarity between two or more natural language code vectors may be calculated to determine a degree of similarity between two or more code-summary pairs. The code-summary pairs and their corresponding natural language code vectors may be placed in a search index, such as the search index previously described in relation to block 240 of method 200. Storage of the natural language code vectors in the search index may facilitate more efficient recall of natural language code vectors for faster vector comparisons. In some embodiments, upon the completion of the block 430, the code analysis system may be configured, trained, and prepared to receive and process a query to the code analysis system.

The code analysis system may be configured, trained, and prepared to receive and process a query directed to the code analysis system by using a deep neural network, such as the deep neural network 115 of system 100. The deep neural network may generate one or more deep learning models in which the deep learning models may be taught to output natural language code vectors based on inputs such as obtained training code, extracted features of the obtained training code, and generated code summaries of the obtained training code. The deep learning models may include MLP models, LSTM models, and/or similar models. In some embodiments, multiple different deep learning models may be used, and the outputted natural language code vectors from each of the deep learning models responsive to the same input may be concatenated into a concatenated natural language code vector. Concatenation of the outputted natural language code vectors from the multiple different deep learning models responsive to the same input may capture more conceptual information about the obtained training code, extracted features of the obtained training code, and/or generated code summaries of the obtained training code than any outputted natural language code vector may capture alone. For example, a deep neural network may include two deep learning models, such as an MLP model and an LSTM model, and the deep neural network may receive a piece of source code as an input. The MLP model may output a first natural language code vector related to the piece of source code received as an input, and the LSTM model may output a second natural language code vector related to the same piece of source code received as an input. The first natural language code vector may be concatenated with the second natural language code vector to produce a concatenated natural language code vector related to the piece of source code received as an input.

One or more concatenated natural language code vectors may be analyzed and processed by the deep neural network to configure, train, and/or prepare the deep neural network for receiving and processing a query directed to the code analysis system. The one or more concatenated natural language code vectors may be passed through a dense layer of the deep neural network. The dense layer of the deep neural network may analyze the one or more concatenated natural language code vectors to determine relationships between the concatenated natural language code vectors and the source code from which the concatenated natural language code vectors were computed. In some embodiments, the one or more concatenated natural language code vectors may be sequentially passed through more than one dense layer of the deep neural network. In these and other embodiments, a batch normalization step may occur between each dense layer. The batch normalization step may standardize the inputs to each dense layer.

Modifications, additions, or omissions may be made to the method 400 without departing from the scope of the disclosure. For example, the designations of different elements in the manner described is meant to help explain concepts described herein and is not limiting. Further, the method 400 may include any number of other elements or may be implemented within other systems or contexts than those described.

Figure 5:
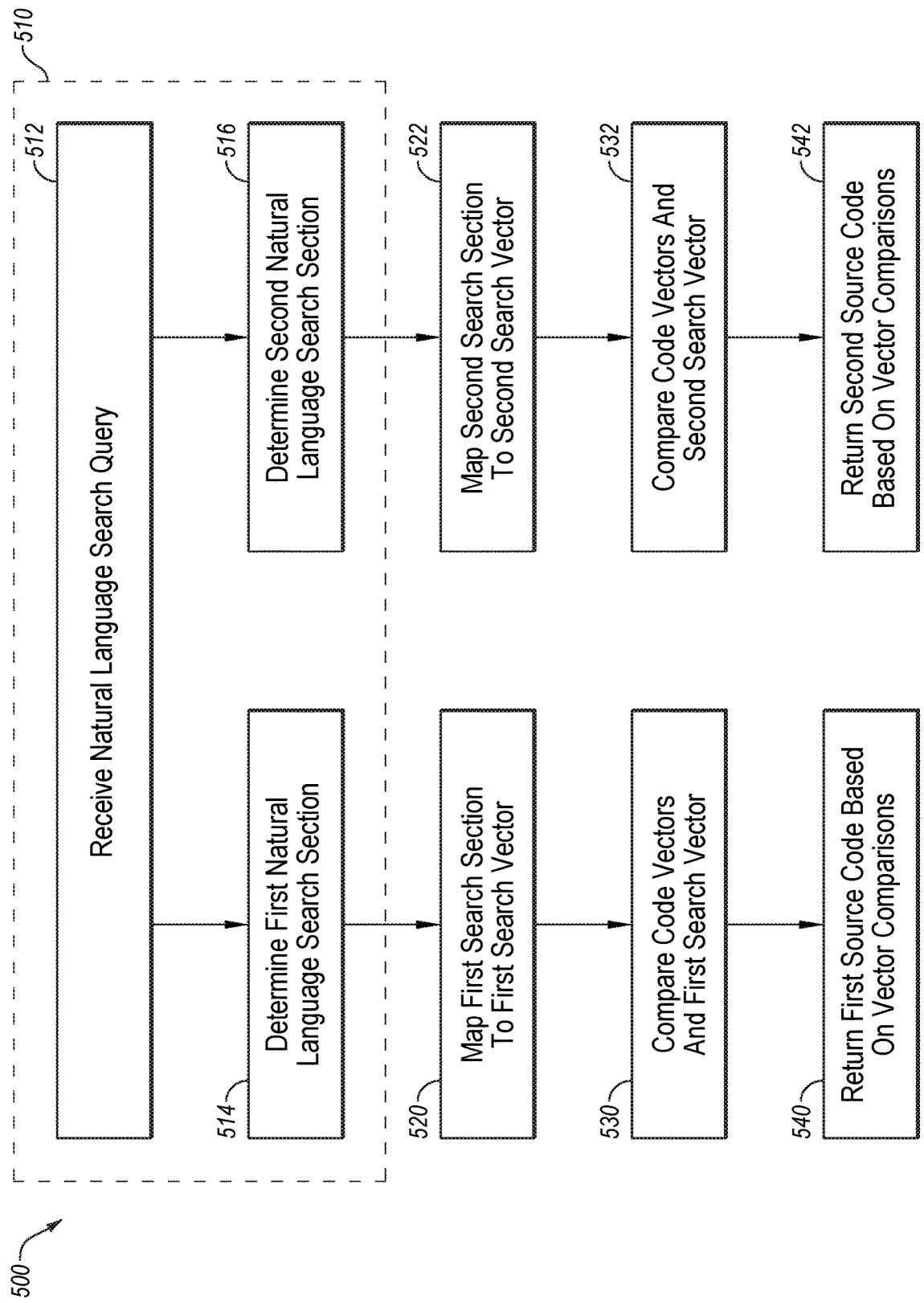
FIG. 5 is a flowchart of an example method of organizing a natural language search query into a first natural language search section and a second natural language search section and returning suggested source code based on each of the natural language search sections.

FIG. 5 is a flowchart of an example method 500 of organizing a natural language search query into a first natural language search section and a second natural language search section and returning suggested source code responsive to each of the natural language search sections. In some embodiments, the method 500 may provide a more detailed description for the steps described in method 200 at blocks 250, 260, 270, and/or 280. In some embodiments, the method 500 may replace the steps described in method 200 at blocks 250, 260, 270, and/or 280. Although illustrated with discrete blocks, the steps and operations associated with one or more of the blocks of the method 500 may be divided into additional blocks, combined into fewer blocks, or eliminated, depending on the particular implementation.

The method 500 may begin at block 510, where a natural language search query is received and separated into two or more natural language search sections. Receiving a natural language search query at block 512 may be accomplished in the same or a similar process to receiving the natural language search query at block 250 in method 200. A code analysis system, such as the code analysis system 110 or the deep neural network 115 described in relation to system 100, may determine whether the natural language search query received at block 512 includes two or more tasks that utilize distinct source code to accomplish each task.

Upon determining that the natural language search query includes two or more tasks that utilize distinct source code to accomplish each task, the natural language search query may be separated into two or more natural language search sections, such as determining a first natural language search section at block 514 and determining a second natural language search section at block 516. In these and other embodiments, each natural language search section may be implemented by at least one piece of source code. If a given natural language search section utilizes more than one piece of source code to accomplish a corresponding task, the given natural language search section may be further divided into two or more natural language search sections.

At block 520, the first natural language search section may be mapped to a first natural language search vector. Mapping the first natural language search section to a first natural language search vector may be accomplished in the same or a similar process to mapping the natural language search vector at block 260 of method 200. At block 522, the second natural language search may be mapped to a second natural language search vector in the same process or by a similar process to mapping the first natural language search section to the first natural language search section at block 520.

At block 530, the first natural language search vector may be compared to the natural language code vectors. Comparison between the first natural language search vector and the natural language code vectors may be achieved by the same process or a similar process to comparing the natural language search vector and the natural language code vectors at block 270 of method 200. At block 532, the second natural language search vector may be compared to the natural language code vectors in the same process or by a similar process to comparing the first natural language search vector to the natural language code vectors at block 530.

At block 540, a first suggested source code may be returned based on the comparison between the first natural language search vector and the natural language code vectors. At block 542, a second suggested source code may be returned based on the comparison between the second natural language search vector and the natural language code vectors. The suggestion of source code in response to the comparison between the first and second natural language search vectors and the natural language code vectors at blocks 540 and 542, respectively, may be achieved by the same process or by a similar process to suggesting source code based on the comparison between the natural language search vector and the natural language code vectors at block 280 of method 200.

In these and other embodiments, more than one piece of suggested source code may be returned as the first source code of the block 540 if more than one piece of source code is responsive to the comparison between the first natural language search vector and the natural language code vectors. Additionally or alternatively, more than one piece of suggested source code may be returned as the second source code of the block 542 if more than one piece of source code is responsive to the comparison between the second natural language search vector and the natural language code vectors. In these and other embodiments, the first suggested source code may be presented as source code responsive to the first natural language search section, and the second suggested source code may be presented as source code responsive to the second natural language search section. Additionally or alternatively, the first suggested source code and the second suggested source code may be presented together as source code responsive to the natural language search query.

Modifications, additions, or omissions may be made to the method 500 without departing from the scope of the disclosure. For example, the designations of different elements in the manner described is meant to help explain concepts described herein and is not limiting. Further, the method 500 may include any number of other elements or may be implemented within other systems or contexts than those described.

Figure 6:
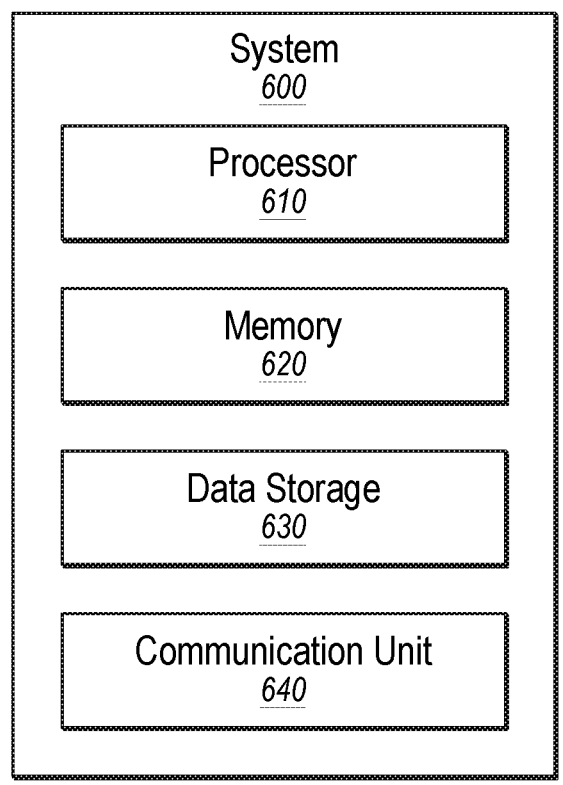
FIG. 6 illustrates an example computing system.

FIG. 6 illustrates an example computing system 600, according to at least one embodiment described in the present disclosure. The computing system 600 may include a processor 610, a memory 620, a data storage 630, and/or a communication unit 640, which all may be communicatively coupled. Any or all of the system 100 of FIG. 1 may be implemented as a computing system consistent with the computing system 600, including the code analysis system 110, the training code servers 120 and/or the natural language search query 140.

Generally, the processor 610 may include any suitable special-purpose or general-purpose computer, computing entity, or processing device including various computer hardware or software modules and may be configured to execute instructions stored on any applicable computer-readable storage media. For example, the processor 610 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 6, it is understood that the processor 610 may include any number of processors distributed across any number of network or physical locations that are configured to perform individually or collectively any number of operations described in the present disclosure. In some embodiments, the processor 610 may interpret and/or execute program instructions and/or process data stored in the memory 620, the data storage 630, or the memory 620 and the data storage 630. In some embodiments, the processor 610 may fetch program instructions from the data storage 630 and load the program instructions into the memory 620.

After the program instructions are loaded into the memory 620, the processor 610 may execute the program instructions, such as instructions to perform any of the methods 200, 300, 400, and/or 500 of FIGS. 2, 3, 4 and 5, respectively. For example, the processor 610 may obtain instructions regarding obtaining training code, extracting features from the training code, and/or mapping the extracted features to natural language code vectors.

The memory 620 and the data storage 630 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 610. For example, the memory 620 and/or the data storage 630 may store obtained training code (such as the training code obtained at block 210 of FIG. 2). In some embodiments, the computing system 600 may or may not include either of the memory 620 and the data storage 630.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 610 to perform a certain operation or group of operations.

The communication unit 640 may include any component, device, system, or combination thereof that is configured to transmit or receive information over a network. In some embodiments, the communication unit 640 may communicate with other devices at other locations, the same location, or even other components within the same system. For example, the communication unit 640 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 640 may permit data to be exchanged with a network and/or any other devices or systems described in the present disclosure. For example, the communication unit 640 may allow the system 600 to communicate with other systems, such as computing devices and/or other networks.

One skilled in the art, after reviewing this disclosure, may recognize that modifications, additions, or omissions may be made to the system 600 without departing from the scope of the present disclosure. For example, the system 600 may include more or fewer components than those explicitly illustrated and described.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, it may be recognized that changes may be made in form and detail without departing from the scope of the present disclosure. Thus, the present disclosure is limited only by the claims.

In some embodiments, the different components, modules, engines, and services described herein may be implemented as objects or processes that execute on a computing system (e.g., as separate threads). While some of the systems and processes described herein are generally described as being implemented in software (stored on and/or executed by general purpose hardware), specific hardware implementations or a combination of software and specific hardware implementations are also possible and contemplated.

Terms used in the present disclosure and especially in the appended claims (e.g., bodies of the appended claims) are generally intended as "open terms" (e.g., the term "including" should be interpreted as "including, but not limited to.").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is expressly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase preceding two or more alternative terms, whether in the description, claims, or drawings, should be understood to contemplate the possibilities of including one of the terms, either of the terms, or both of the terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

The invention claimed is:

1. A method, comprising:
    obtaining training code that includes a plurality of pieces of source code;
    sorting the obtained training code according to a popularity associated with each of the pieces of source code, the popularity of a given piece of source code being determined based on one or more factors selected from a list including: a review rating of the given piece of source code, a number of times the given piece of source code has been included in watch lists, a number of commits of the given piece of source code, a number of pull requests for the given piece of source code, and a number of positive reviews of the given piece of source code;
    selecting one or more of the pieces of source code as filtered training code based on the popularity associated with each of the pieces of source code;
    extracting features from the filtered training code;
    storing the extracted features in a code dataset;
    mapping, by a deep neural network the extracted features from the filtered training code to natural language code vectors, the deep neural network including at least a first deep learning model and a second deep learning model different from the first deep learning model, the mapping including:
        receiving a given source code segment of the filtered training dataset as an input for the first deep learning model and the second deep learning model;
        outputting by the first deep learning model a first natural language code vector of the natural language code vectors;
        outputting by the second deep learning model a second natural language code vector of the natural language code vectors; and
        concatenating the first natural language code vector and the second natural language code vector as a concatenated natural language code vector mapped to the given source code segment;
    receiving a natural language search query for source-code suggestions;
    mapping, by the deep neural network, the natural language search query to a natural language search vector;
    comparing the natural language search vector to the concatenated natural language code vectors; and
    responding to the natural language search query with source code based on the comparing the natural language search vector to the concatenated natural language code vectors.

2. The method of claim 1, further comprising generating a test-case feature and storing the test-case feature in the code dataset, wherein generating the test-case feature comprises:
    parsing the filtered training code;
    determining a test-execution environment for the parsed training code based on the parsed training code;
    validating execution of the parsed training code based on the test-execution environment; and
    generating a test-case feature of the parsed training code, wherein the test-case feature indicates whether the parsed training code is executable in the test-execution environment.

3. The method of claim 1, wherein the extracting features from the filtered training code comprises extracting at least one of code snippets, software documentation, code comments, or test-case logs from the filtered training code.

4. The method of claim 1, wherein the deep neural network comprises at least one of a multilayer perceptron (MLP) network, a long short-term memory (LSTM) network, and an average-stochastic gradient descent weight-dropped long short-term memory (AWD LSTM) network.

5. The method of claim 1, further comprising:
    generating code summaries for the extracted features by the deep neural network, the code summaries including natural language descriptions of the extracted features; and
    wherein the mapping the extracted features to the natural language code vectors is based on the generated code summaries.

6. The method of claim 1, wherein the comparing the natural language search vector to the concatenated natural language code vectors is based on a cosine similarity between the natural language search vector and the concatenated natural language code vectors.

7. The method of claim 1,
wherein the mapping the natural language search query to the natural language search vector comprises:
organizing the natural language search query into a first natural language search section and a second natural language search section;
mapping the first natural language search section to a first natural language search vector; and
mapping the second natural language search section to a second natural language search vector,
wherein the comparing the natural language search vector and the concatenated natural language code vectors comprises:
comparing the first natural language search vector to the concatenated natural language code vectors; and
comparing the second natural language search vector to the concatenated natural language code vectors, and
wherein responding to the natural language search query with the source code includes:
identifying a first piece of source code based on the comparing the first natural language search vector to the concatenated natural language code vectors; and
identifying a second piece of source code based on the comparing the second natural language search vector to the concatenated natural language code vectors.

8. One or more non-transitory computer-readable storage media configured to store instructions that, in response to being executed, cause a system to perform operations, the operations comprising:
obtaining training code that includes a plurality of pieces of source code;
sorting the obtained training code according to a popularity associated with each of the pieces of source code, the popularity of a given piece of source code being determined based on one or more factors selected from a list including: a review rating of the given piece of source code, a number of times the given piece of source code has been included in watch lists, a number of commits of the given piece of source code, a number of pull requests for the given piece of source code, and a number of positive reviews of the given piece of source code;
selecting one or more of the pieces of source code as filtered training code based on the popularity associated with each of the pieces of source code;
extracting features from the filtered training code;
storing the extracted features in a code dataset;
mapping, by a deep neural network the extracted features from the filtered training code to natural language code vectors, the deep neural network including at least a first deep learning model and a second deep learning model different from the first deep learning model, the mapping including:
receiving a given source code segment of the filtered training dataset as an input for the first deep learning model and the second deep learning model;
outputting by the first deep learning model a first natural language code vector of the natural language code vectors;
outputting by the second deep learning model a second natural language code vector of the natural language code vectors; and
concatenating the first natural language code vector and the second natural language code vector as a concatenated natural language code vector mapped to the given source code segment;
receiving a natural language search query for source-code suggestions;
mapping, by the deep neural network, the natural language search query to a natural language search vector;
comparing the natural language search vector to the concatenated natural language code vectors; and
responding to the natural language search query with source code based on the comparing the natural language search vector to the concatenated natural language code vectors.

9. The one or more non-transitory computer-readable storage media of claim 8, further comprising generating a test-case feature and storing the test-case feature in the code dataset, wherein generating the test-case feature comprises:
parsing the filtered training code;
determining a test-execution environment for the parsed training code based on the parsed training code;
validating execution of the parsed training code based on the test-execution environment; and
generating a test-case feature of the parsed training code, wherein the test-case feature indicates whether the parsed training code is executable in the test-execution environment.

10. The one or more non-transitory computer-readable storage media of claim 8, wherein the extracting features from the filtered training code comprises extracting at least one of code snippets, software documentation, code comments, and test-case logs from the filtered training code.

11. The one or more non-transitory computer-readable storage media of claim 8, wherein the deep neural network comprises at least one of a multilayer perceptron (MLP) network, a long short-term memory (LSTM) network, and an average-stochastic gradient descent weight-dropped long short-term memory (AWD LSTM) network.

12. The one or more non-transitory computer-readable storage media of claim 8, further comprising:
generating code summaries for the extracted features by the deep neural network, the code summaries including natural language descriptions of the extracted features; and
wherein the mapping the extracted features to the natural language code vectors is based on the generated code summaries.

13. The one or more non-transitory computer-readable storage media of claim 8, wherein the comparing the natural language search vector to the concatenated natural language code vectors is based on a cosine similarity between the natural language search vector and the concatenated natural language code vectors.

14. The one or more non-transitory computer-readable storage media of claim 8,
wherein the mapping the natural language search query to the natural language search vector comprises:
organizing the natural language search query into a first natural language search section and a second natural language search section;
mapping the first natural language search section to a first natural language search vector; and
mapping the second natural language search section to a second natural language search vector,
wherein the comparing the natural language search vector and the concatenated natural language code vectors comprises:
comparing the first natural language search vector to the concatenated natural language code vectors; and comparing the second natural language search vector to the concatenated natural language code vectors, and
wherein responding to the natural language search query with the source code includes:
  identifying a first piece of source code based on the comparing the first natural language search vector to the concatenated natural language code vectors; and
  identifying a second piece of source code based on the comparing the second natural language search vector to the concatenated natural language code vectors.

15. A system comprising:
one or more processors; and
one or more non-transitory computer-readable storage media configured to store instructions that, in response to being executed, cause the system to perform operations, the operations comprising:
  obtaining training code that includes a plurality of pieces of source code;
  sorting the obtained training code according to a popularity associated with each of the pieces of source code, the popularity of a given piece of source code being determined based on one or more factors selected from a list including: a review rating of the given piece of source code, a number of times the given piece of source code has been included in watch lists, a number of commits of the given piece of source code, a number of pull requests for the given piece of source code, and a number of positive reviews of the given piece of source code;
  selecting one or more of the pieces of source code as filtered training code based on the popularity associated with each of the pieces of source code;
  extracting features from the filtered training code;
  storing the extracted features in a code dataset;
  mapping, by a deep neural network the extracted features from the filtered training code to natural language code vectors, the deep neural network including at least a first deep learning model and a second deep learning model different from the first deep learning model, the mapping including:
    receiving a given source code segment of the filtered training dataset as an input for the first deep learning model and the second deep learning model;
    outputting by the first deep learning model a first natural language code vector of the natural language code vectors;
    outputting by the second deep learning model a second natural language code vector of the natural language code vectors; and
    concatenating the first natural language code vector and the second natural language code vector as a concatenated natural language code vector mapped to the given source code segment;
  receiving a natural language search query for source-code suggestions;
  mapping, by the deep neural network, the natural language search query to a natural language search vector;
  comparing the natural language search vector to the concatenated natural language code vectors; and
  responding to the natural language search query with source code based on the comparing the natural language search vector to the concatenated natural language code vectors.

16. The system of claim 15, further comprising generating a test-case feature and storing the test-case feature in the code dataset, wherein generating the test-case feature comprises:
  parsing the filtered training code;
  determining a test-execution environment for the parsed training code based on the parsed training code;
  validating execution of the parsed training code based on the test-execution environment; and
  generating a test-case feature of the parsed training code, wherein the test-case feature indicates whether the parsed training code is executable in the test-execution environment.

17. The system of claim 15, wherein the extracting features in the filtered training code comprises extracting at least one of code snippets, software documentation, code comments, and test-case logs from the filtered training code.

18. The system of claim 15, wherein the deep neural network comprises at least one of a multilayer perceptron (MLP) network, a long short-term memory (LSTM) network, and an average-stochastic gradient descent weight-dropped long short-term memory (AWD LSTM) network.

19. The system of claim 18, further comprising:
  generating code summaries for the extracted features by the deep neural network, the code summaries including natural language descriptions of the extracted features; and
  wherein the mapping the extracted features to the natural language code vectors is based on the generated code summaries.

20. The system of claim 15,
wherein the mapping the natural language search query to the natural language search vector comprises:
  organizing the natural language search query into a first natural language search section and a second natural language search section;
  mapping the first natural language search section to a first natural language search vector; and
  mapping the second natural language search section to a second natural language search vector,
wherein the comparing the natural language search vector and the concatenated natural language code vectors comprises:
  comparing the first natural language search vector to the concatenated natural language code vectors; and
  comparing the second natural language search vector to the concatenated natural language code vectors, and
wherein responding to the natural language search query with the source code includes:
  identifying a first piece of source code based on the comparing the first natural language search vector to the concatenated natural language code vectors; and
  identifying a second piece of source code based on the comparing the second natural language search vector to the concatenated natural language code vectors.

* * * * *